US010981405B2

(12) United States Patent
Araki et al.

(10) Patent No.: US 10,981,405 B2
(45) Date of Patent: Apr. 20, 2021

(54) RECORDING MEDIUM SUBSTRATE AND RECORDING MEDIUM

(71) Applicant: CANON KABUSHIKI KAISHA, Tokyo (JP)

(72) Inventors: Kazuhiko Araki, Kawasaki (JP); Tetsuro Noguchi, Hachioji (JP); Arika Tanaka, Yokohama (JP); Shoichi Takeda, Yokohama (JP); Hiroo Miyamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 16/185,747

(22) Filed: Nov. 9, 2018

(65) Prior Publication Data

US 2019/0143728 A1 May 16, 2019

(30) Foreign Application Priority Data

Nov. 10, 2017 (JP) ............................. JP2017-217187

(51) Int. Cl.
*B41M 5/50* (2006.01)
*B41M 5/52* (2006.01)
*B32B 27/10* (2006.01)

(52) U.S. Cl.
CPC ............ *B41M 5/508* (2013.01); *B41M 5/502* (2013.01); *B41M 5/506* (2013.01); *B41M 5/52* (2013.01); *B32B 27/10* (2013.01); *B41M 5/5218* (2013.01); *B41M 5/5227* (2013.01)

(58) Field of Classification Search
CPC ... B41M 5/502; B41M 5/5218; B41M 5/5227
USPC ....................................................... 428/32.2
See application file for complete search history.

(56) References Cited

U.S. PATENT DOCUMENTS

| | | | |
|---|---|---|---|
| 4,202,870 A | 5/1980 | Weber et al. | |
| 4,242,271 A | 12/1980 | Weber et al. | |
| 5,955,185 A | 9/1999 | Yoshino et al. | |
| 5,965,252 A | 10/1999 | Santo et al. | |
| 6,342,289 B1 | 1/2002 | Eguchi et al. | |
| 6,558,740 B1 | 5/2003 | Santo et al. | |
| 7,144,613 B2 | 12/2006 | Eguchi et al. | |
| 7,846,516 B2 | 12/2010 | Kamo et al. | |
| 8,252,392 B2 | 8/2012 | Oguri et al. | |
| 8,431,194 B2 | 4/2013 | Noguchi et al. | |
| 8,486,499 B2 | 7/2013 | Nito et al. | |
| 8,524,336 B2 | 9/2013 | Oguri et al. | |
| 8,609,209 B2 | 12/2013 | Taguri et al. | |
| 8,795,798 B2 | 8/2014 | Oguri et al. | |
| 9,302,525 B2 | 4/2016 | Oguri et al. | |
| 9,662,921 B2 | 5/2017 | Sugiura et al. | |
| 2001/0055055 A1 | 12/2001 | Eguchi et al. | |
| 2003/0231237 A1* | 12/2003 | Nagaike ................. B41M 5/508 347/105 |
| 2006/0028527 A1* | 2/2006 | Kaga ..................... B41M 5/508 347/105 |
| 2009/0011155 A1* | 1/2009 | Kamo .................... B41M 5/506 428/32.25 |
| 2011/0076518 A1 | 3/2011 | Noguchi et al. | |

FOREIGN PATENT DOCUMENTS

| | | |
|---|---|---|
| EP | 0 630 759 A1 | 12/1994 |
| EP | 1 142 701 A1 | 10/2001 |
| EP | 2 679 395 A2 | 1/2014 |
| EP | 2 719 543 A2 | 4/2014 |
| JP | S61-10483 A | 1/1986 |
| JP | H05-16015 B2 | 3/1993 |
| JP | H07-232473 A | 9/1995 |
| JP | H08-132731 A | 5/1996 |
| JP | H09-66664 A | 3/1997 |
| JP | H09-76628 A | 3/1997 |
| JP | H11-334224 A | 12/1999 |
| JP | 2009-214511 A | 9/2009 |
| JP | 2011-093309 A | 5/2011 |
| JP | 2012-153123 A | 8/2012 |
| WO | 2006/083033 A1 | 8/2006 |

OTHER PUBLICATIONS

Apr. 2, 2019 partial European Search Report in European Patent Appln. No. 18205090.6.
Extended Search Report in European Patent Application No. 18205090. 6, dated Aug. 30, 2019.

* cited by examiner

*Primary Examiner* — Betelhem Shewareged
(74) *Attorney, Agent, or Firm* — Venable LLP

(57) ABSTRACT

A recording medium substrate in an aspect of the present invention is a recording medium substrate having a base paper and a stretched film layer on the base paper, wherein the stretched film layer has a thickness of 70 μm or more, and the recording medium substrate has an average surface roughness of 0.3 μm or less. A recording medium in another aspect of the present invention includes a recording medium substrate, a first ink receiving layer on the recording medium substrate, and a second ink receiving layer on the first ink receiving layer, wherein the first ink receiving layer is in contact with the second ink receiving layer, the first ink receiving layer contains an alumina hydrate and a hydroxy acid, the second ink receiving layer contains an alumina hydrate and a sulfonic acid.

11 Claims, No Drawings

RECORDING MEDIUM SUBSTRATE AND RECORDING MEDIUM

BACKGROUND OF THE INVENTION

Field of the Invention

The present invention relates to a recording medium substrate and a recording medium.

Description of the Related Art

A recording medium, in particular, a recording medium for recording photographic images, is required to achieve images with high image clarity and high image density. A recording medium having a substrate of paper mainly containing cellulose, however, may not achieve sufficient image clarity due to irregularities caused by the texture of paper in some cases. Meanwhile, a recording medium having a substrate of plastic film such as a polyester film achieves high image clarity due to smoothness of the plastic film, but failed to achieve the texture of paper. A recording medium having both of the high image clarity and the texture of paper has been therefore required.

Japanese Patent Application Laid-Open No. H11-334224 discloses a substrate for use in a thermal transfer receiving sheet having a cellulose core material layer and a film layer disposed on the surface of the cellulose core material layer. The cellulose core material layer has a coating layer with a maximum surface roughness (Rmax) of 7.0 μm or less based on JIS K0601, and a film layer laminated on the coating layer by melt extrusion of a resin mainly containing polyolefin.

Meanwhile, a recording medium having an ink receiving layer with a porous structure that retains a porous inorganic particle such as a silica particle and an alumina hydrate particle with a binder is suitably used as an ink jet recording medium. Such a recording medium may crack during application or drying of a coating liquid for formation of an ink receiving layer in some cases when the recording medium is produced. In order to prevent the occurrence of cracks, it is effective to reduce the application quantity of the coating liquid. In this case, however, image blurring under high humidity and a so-called bronzing phenomenon, i.e., aggregation of dye molecules to exhibit metallic luster, may occur in some cases.

Japanese Patent Application Laid-Open No. 2011-93309 discloses a recording medium having two or more ink receiving layers on a substrate. Among the ink receiving layers, a top layer that is the most remote from a substrate of the ink receiving layers contains at least one selected from the group consisting of an alumina hydrate and alumina, a specific carboxylic acid, and a hydrophilic binder. Among the ink receiving layers, a lower layer that is immediately below the top layer contains at least one selected from the group consisting of an alumina hydrate and alumina, a specific sulfonic acid, and a hydrophilic binder.

SUMMARY OF THE INVENTION

The present invention is directed to provide a recording medium substrate allowing a recording medium having high image clarity while maintaining the texture of paper to be provided. Further, the present invention is directed to provide a recording medium having a high image density, with a bronzing phenomenon and image blurring under high humidity being suppressed.

According to one aspect of the present invention, there is provided a recording medium substrate having a base paper and a stretched film layer on the base paper, wherein the stretched film layer has a thickness of 70 μm or more, and the recording medium substrate has an average surface roughness of 0.3 μm or less.

According to another aspect of the present invention, there is provided a recording medium including the recording medium substrate and an ink receiving layer on the recording medium substrate.

According to still another aspect of the present invention, there is provided a recording medium including a recording medium substrate, a first ink receiving layer on the recording medium substrate, and a second ink receiving layer on the first ink receiving layer, wherein the first ink receiving layer is in contact with the second ink receiving layer, the first ink receiving layer contains an alumina hydrate and a hydroxy acid, the second ink receiving layer contains an alumina hydrate and a sulfonic acid.

Further features of the present invention will become apparent from the following description of exemplary embodiments.

DESCRIPTION OF THE EMBODIMENTS

Preferred embodiments of the present invention will now be described in detail.

Through investigation by the present inventors, it has been found that the recording medium described in Japanese Patent Application Laid-Open No. H11-334224 cannot achieve sufficient image clarity in some cases, because the irregularities in the surface of the cellulose core material layer reduce the image clarity of the recording medium. Further, it has been found that the recording medium described in Japanese Patent Application Laid-Open No. 2011-93309 may cause a reduction in the image density in some cases.

With reference to preferred embodiments, the present invention is described in detail as follows.

First Embodiment (Recording Medium Substrate)

A recording medium substrate in the present embodiment (hereinafter, also referred to as "substrate") has a base paper and a stretched film layer on the base paper. The stretched film layer has a thickness of 70 μm or more. The recording medium substrate has an average surface roughness of 0.3 μm or less.

Through investigation of the image clarity of recording media by the present inventors, it has been found that even with the substrate described in Japanese Patent Application Laid-Open No. H11-334224, the irregularities in the surface of a base paper mainly containing cellulose have effect on the irregularities in the surface of the substrate as yet. As a solution to the problem, the present inventors have found that a substrate having high image clarity while maintaining the texture of paper can be obtained by laminating a stretched film excellent in smoothness on a base paper. Further, the present inventors have found that by setting the thickness of the stretched film layer on the base paper to 70 μm or more, the effect of the irregularities in the surface of a base paper on the configuration of the substrate surface can be effectively suppressed, so that the average surface roughness of the substrate can be 0.3 μm or less. By using such a substrate with suppressed effect of the irregularities in the surface of a base paper, the irregularities in the surface of an ink receiving layer disposed on the substrate can be also suppressed, so that a recording medium having high image clarity while maintaining the texture of paper can be obtained. Incidentally, in the present embodiment, the term "recording medium" includes a recording medium before image recording and a recording medium after image recording. Preferably, the recording medium is an ink jet recording medium for use in an inkjet recording method. In the present invention, both of the average surface roughness of a recording medium substrate and a base paper are arithmetic average roughness (Ra).

<Base Paper>

As the base paper supporting the substrate of the present embodiment, a pulp-containing base paper in a sheet form may be used. As the pulp, natural pulp, a recycled pulp, a synthetic pulp, and the like may be used singly or in combination of two or more thereof. The base paper may include additives for general use in paper making such as a sizing agent, a paper strengthening agent, a filler, an antistatic agent, a fluorescent whitening agent and a dye, in addition to a pulp. Further, the surface of the base paper may be coated with a surface sizing agent, a paper surface strengthening agent, a fluorescent whitening agent, an antistatic agent, a dye, an anchoring agent, and the like.

The average surface roughness (Ra) of a base paper is preferably 2.0 µm or less, more preferably 0.5 µm or less, still more preferably 0.45 µm or less, especially preferably 0.4 µm or less, to further suppress the irregularities of the surface of a substrate. The lower limit of the range of Ra of a base paper is not specifically limited. For example, Ra of a base paper is preferably 0 µm or more to 2.0 µm or less. Incidentally, Ra of a base paper is a value measured by a method described below.

The thickness of a base paper is preferably 50 µm or more to 250 µm or less, more preferably 80 µm or more to 200 µm or less, still more preferably 90 µm or more to 150 µm or less, from the viewpoint of rigidity of the paper and the like. Incidentally, the thickness of a base paper in the present invention is a value measured by the following method. First, the cross section of a recording medium is cut out by a microtome to be observed by a scanning electron microscope. The thickness of a base paper is measured at any 100 or more points, and the average thereof is regarded as the thickness of the base paper. The thickness of a layer (for example, substrate and ink receiving layer) other than the base layer in the present invention is calculated in the same manner.

Preferably, the base paper is a base paper surface-treated by treatment such as compressing by a calendar or the like during paper making or after paper making, from the viewpoint of surface smoothness. The paper density of the base paper specified in JIS P 8118 is preferably 0.6 g/cm$^3$ or more to 1.2 g/cm$^3$ or less, more preferably 0.7 g/cm$^3$ or more to 1.2 g/cm$^3$ or less.

Preferably, the base paper has a coating layer on the surface from the viewpoint of smoothness. The coating layer can include an adhesive, and in addition thereto, a pigment on an as needed basis. Examples of the adhesive include emulsion of a polymer or copolymer such as a styrene-butadiene copolymer, a methyl methacrylate-styrene-butadiene copolymer, a vinyl acetate resin, and an acrylic resin, which may be used alone or mixed for use, though not limited thereto. Alternatively, water-soluble polymer adhesives such as polyvinyl alcohol, starch and casein may be used alone or mixed for use. Alternatively, polymer adhesives soluble in an organic solvent such as toluene may be used.

Examples of the pigment include white pigments for use in regular coated printing paper such as various types of clay such as kaolin, calcium carbonate, titanium dioxide, aluminum hydroxide, satin white, talc, calcium sulfite, calcined clay, fine powder silica, and organic filler. These pigments may be used alone or mixed for use. Further, the coating layer may appropriately contain a defoamer, a dispersant, a conducting agent, and a wetting agent, and the like.

In the case where the base paper has a coating layer, it is preferred that the surface of the coating layer is subjected to a smoothening treatment such as super calendaring and cast finishing so as to have an average surface roughness (Ra) of the coating layer of 2.0 µm or less. The average surface roughness (Ra) of the coating layer is more preferably 0.5 µm or less, still more preferably 0.45 µm or less, especially preferably 0.4 µm or less. The lower limit of the range of Ra of a coating layer is not specifically limited. For example, Ra of a coating layer is preferably 0 µm or more to 2.0 µm or less.

<Stretched Film Layer>

A stretched film layer disposed on the base paper includes a stretched film so as to smooth the surface of the substrate in the present embodiment. The stretched film layer may be disposed on one face of the base paper, or may be disposed on both faces of the base paper. The thickness of the stretched film layer is 70 µm or more. With a thickness of the stretched film of less than 70 µm, the substrate surface is insufficiently smoothed due to the effect of the irregularities of the surface of the base paper, so that the image clarity of the recording medium is reduced. The thickness of the stretched film layer is preferably 75 µm or more to 200 µm or less, more preferably 80 µm or more to 200 µm or less, still more preferably 85 µm or more to 150 µm or less, especially preferably 90 µm or more to 130 µm or less.

The stretched film may be either transparent or opaque, or may be colored. The stretched film may contain a pigment or the like, or may include voids caused by a foaming agent or voids caused by stretching. Further, the stretched film may have a multilayer structure. The stretched film for use may be a uniaxially stretched film or a biaxially stretched film. Among them, the stretched film is preferably the biaxially stretched film. For example, a biaxially stretched film having a stretch ratio (in the case of film) or a draw ratio (in the case of fiber) of 2 to 10 in each of the longitudinal direction and the transverse direction may be used.

A thermoplastic resin can be used as raw material for the stretched film. Examples of the thermoplastic resin include polyethylene, polyvinyl chloride, a styrene resin such as polystyrene, AS (acrylonitrile-styrene resin) and ABS (acrylonitrile-butadiene-styrene resin), polypropylene, PMMA (polymethyl methacrylate resin) and PET (polyethylene terephthalate). These may be used singly or in combination of two or more thereof. The stretched film may contain an inorganic particle, an organic particle, a fluorescent whitening agent or the like, so as to adjust the degree of whiteness, and may further contain an additive such as an antistatic agent, a heat stabilizer, an antioxidant, a UV absorber, a light stabilizer, a softener, an antislipping agent.

A biaxially stretched polyester film is preferred as the stretched film from the viewpoint of obtaining higher smoothness, because the film has a relatively high heat resistance, resulting in less thermal deformation during lamination with a base paper or during formation of an ink receiving layer.

It is preferred that the substrate has a adhesion layer between the base paper and the stretched film layer, from the viewpoint of improving adhesion of the stretched film layer to the base paper. The method for laminating the stretched film on the base paper is not particularly limited. Examples of the method include a dry laminating process including applying an adhesive to a base paper with a roll such as a gravure roll, drying a solvent in a drying oven, laminating the stretched film to the base paper on a heated metal roll. Examples thereof further include a laminating process through a two-faced adhesive sheet and an extrusion sandwich laminating process. Among them, use of the extrusion sandwich laminating process is preferred from the viewpoint of obtaining higher smoothness, through suppression of the transfer of irregularities based on the fiber form of the base paper onto the surface of the stretched film. A resin mainly containing polyolefin is preferred as the resin to make the adhesion layer, which is extruded by an extrusion sandwich laminating process, from the viewpoints of productivity and cost.

In the present invention, "polyolefin" means a polymer made from olefin as a monomer. Specific examples include a homopolymer and a copolymer of ethylene, propylene, isobutylene or the like. One or two or more of polyolefins may be used on an as needed basis. Among them, use of polyethylene as the polyolefin is preferred. A low-density polyethylene (LDPE) and a high-density polyethylene (HDPE) are preferred as the polyethylene. The density of polyolefin is preferably 0.85 to 0.98 g/cm$^3$, more preferably 0.90 to 0.95 g/cm$^3$.

The amount of the resin in the adhesion layer is adjusted such that the adhesion layer has a thickness of preferably 5 to 100 µm, more preferably 10 to 60 µm. In the case where the resin is made of polyolefin, the lamination temperature can be lowered as the melting point of the polyolefin decreases, so that the thermal contraction of the stretched film layer can be suppressed. As a result, the curling of the substrate can be reduced. The melting point of the polyolefin is preferably 80 to 160° C., more preferably 95 to 140° C., for practical use.

As long as the effect of the present invention is not impaired, a thermoplastic resin other than polyolefin may be appropriately used in combination as raw material for the adhesion layer. Examples of the thermoplastic resin include a polystyrene resin, a polyester resin such as polyethylene terephthalate, a nylon resin and a polyurethane resin. The adhesion layer may contain, for example, an inorganic particle, an organic particle, a fluorescent whitening agent. to adjust the degree of whiteness. The adhesion layer may further contain an additive such as an antistatic agent, a heat stabilizer, an antioxidant, a UV absorber, a light stabilizer.

The substrate with a laminated structure of the base paper and the stretched film layer has an average surface roughness (Ra) of 0.3 µm or less. The substrate having an average surface roughness (Ra) of more than 0.3 µm reduces the image clarity of a recording medium. The average surface roughness (Ra) of the substrate is preferably 0.25 µm or less, more preferably 0.22 µm or less, still more preferably 0.2 µm or less. The lower limit of the range of Ra of the substrate is not particularly limited. For example, Ra of the substrate is 0 µm or more to 0.3 µm or less. Incidentally, Ra of the substrate is a value measured by a method described below. In the present invention, Ra of the substrate represents Ra in the surface on a side where the stretched film layer of the substrate is laminated, i.e., Ra in the surface on a side where an ink receiving layer is disposed.

<Rear-Side Resin Layer>

In the case where the substrate has the stretched film layer on one face of the base paper only, it is preferred that a rear-side resin layer is disposed on a face opposite to the face of the base paper having the stretched film layer from the viewpoint of suppression of the curling of the substrate (hereinafter, also referred to as "rear side").

A thermoplastic resin is preferred as the resin to make the rear-side resin layer. Examples of the thermoplastic resin include an acrylic resin, an acrylic silicone resin, a polyolefin resin, and a styrene-butadiene copolymer. Among them, a polyolefin resin is preferred. Examples of the polyolefin resin include a polyethylene and a polypropylene, and a polyethylene is preferred. A low-density polyethylene (LDPE) and a high-density polyethylene (HDPE) are preferred as the polyethylene. The thickness of the rear-side resin layer is preferably 20 µm or more to 60 µm or less, more preferably 35 µm or more to 50 µm or less.

(Recording Medium)

A recording medium of the present embodiment has the substrate of the present embodiment and an ink receiving layer on the substrate. Since the surface of the substrate of the present embodiment has less irregularities, irregularities in the surface of the ink receiving layer disposed on the substrate can be also reduced. The recording medium of the present embodiment, therefore, has high image clarity while maintaining the texture of paper.

<Ink Receiving Layer>

Preferably, an ink receiving layer contains an alumina hydrate. A particle of alumina hydrate has a long and narrow shape, so that the particle of alumina hydrate is planarly oriented in the ink receiving layer to smooth the surface of the ink receiving layer. The substrate used in the present embodiment has an average surface roughness Ra of 0.3 µm or less so as to reduce the irregularities in the surface, so that formation of the ink receiving layer containing an alumina hydrate can further smooth the surface of a recording medium to further improve the image clarity. The alumina hydrate is not particularly limited, and, for example, an alumina hydrate in the second embodiment described below may be used. Regarding the ink receiving layer containing an alumina hydrate and the forming method thereof also, an ink receiving layer and a forming method thereof in a second embodiment described below may be used, though not limited thereto. For example, various deflocculating acids may be used.

The content of an alumina hydrate in the ink receiving layer is preferably 30% by mass or more to 95% by mass or less, more preferably 40% by mass or more to 90% by mass or less, based on the total mass of the ink receiving layer, from the viewpoint of the smoothness of the surface of the recording medium. The thickness of the ink receiving layer is preferably 15 µm or more to 60 µm or less, more preferably 30 µm or more to 45 µm or less. Incidentally, the thickness of the ink receiving layer in the present invention is a thickness in an absolute dry condition, which is an average obtained by 4-point measurement of a cross section using a scanning electron microscope. Specifically, a square object is used for the thickness measurement at four points 1 cm away from the four corners, respectively, in the direction to the center of gravity of the square.

<Undercoat Layer>

In order to improve adhesion between the substrate and the ink receiving layer, an undercoat layer may be disposed between the substrate and the ink receiving layer. Preferably, the undercoat layer contains a polyurethane resin, a polyester resin, gelatin, a binder or the like. Preferably, the undercoat layer has a thickness of 0.01 µm or more to 5 µm or less.

<Back Coating Layer>

In order to improve handling properties, transportability and rubfastness in transportation during continuous printing with multi-sheet loading, a back coating layer may be disposed on a face opposite to the face where an ink receiving layer of the substrate is disposed. Preferably, the back coating layer contains a white pigment, a binder, and the like. Preferably, the back coating layer has a thickness corresponding to an application quantity in dry state of 0.01 g/m$^2$ or more to 3 g/m$^2$ or less.

Second Embodiment

A recording medium of the present embodiment includes a recording medium substrate (hereinafter, also referred to as "substrate"), a first ink receiving layer on the recording medium substrate (hereinafter, also referred to as "first layer"), and a second ink receiving layer on the first ink receiving layer (hereinafter, also referred to as "second layer"). The first ink receiving layer is in contact with the second ink receiving layer. The first ink receiving layer contains an alumina hydrate and a hydroxy acid. The second ink receiving layer contains an alumina hydrate and a sulfonic acid.

As described above, in the case where the ink receiving layer contains an alumina hydrate, the recording medium has improved image clarity, because the alumina hydrate particle in a long and narrow shape tends to be planarly oriented, so that smoothness of the surface of the ink receiving layer can be improved. Since the ink receiving layer contains an alumina hydrate, color development properties and ink absorbing properties are also improved. On the other hand, the ink receiving layer containing an alumina hydrate is formed by applying a coating liquid for formation of the ink receiving layer, which includes an alumina hydrate dispersion liquid containing an alumina hydrate dispersed by a deflocculating acid as deflocculating agent, and drying the coating liquid. Through extensive study on the effect of the deflocculating acid by the present inventors, it has been found that the type of deflocculating acid has a great effect on the image density, the bronzing phenomenon and the occurrence of image blurring under high humidity of a recording medium.

Specifically, it has been found that in the case where a sulfonic acid is used as the deflocculating acid in a second layer located on the surface side of a recording medium, the image density is improved because a dye in the ink aggregates due to the high acidity of the sulfonic acid so as to be fixed to a near-surface region of the recording medium. Further, it has been found that the occurrence of image blurring caused by diffusion of a dye in the ink receiving layer under high humidity can be suppressed at the same time. It has been found, however, that the bronzing phenomenon that exhibits metallic luster caused by aggregation of a dye easily occurs.

It has been therefore found that the bronzing phenomenon can be effectively suppressed by using a hydroxy acid as deflocculating acid in the first layer located immediately below the second layer, because a hydroxy acid has an acidity lower than a sulfonic acid, less capable of aggregating a dye. In other words, even when a bronzing phenomenon occurs in the second layer due to aggregation of a dye, the dye hardly aggregates in the first layer located immediately below the second layer, so that the bronzing phenomenon is suppressed therein. As a result, the bronzing phenomenon is suppressed in the ink receiving layer as a whole. On the other hand, the image density can be secured due to aggregation of a dye in the second layer located on the surface side. It has also been found that the image blurring under high humidity can be suppressed in the case where a hydroxy acid is used as the deflocculating acid, in the same manner as in the case of using a sulfonic acid as deflocculating acid.

Further, use of a sulfonic acid or a hydroxy acid as deflocculating acid generates no odor, differently from using acetic acid or propionic acid as deflocculating acid. Incidentally, "recording medium" in the present embodiment includes a recording medium before image recording and a recording medium after image recording. Preferably, the recording medium is an inkjet recording medium for use in an inkjet recording method. The recording medium may include an undercoat layer and a back coating layer in addition to the substrate and the ink receiving layer having a first layer and a second layer.

<Recording Medium Substrate>

The substrate is not particularly limited as long as a recording medium can be supported, and may include, for example, a base paper and a film layer. As the base paper and the film layer, for example, a base paper and a film layer in the first embodiment may be used, though not limited thereto, various base papers and film layers may be used. The substrate may further include a rear-side resin layer in the first embodiment.

<Ink Receiving Layer>

An ink receiving layer includes a first layer and a second layer in order from the side adjacent to the substrate, and the first layer is in direct contact with the second layer. The first layer contains an alumina hydrate and a hydroxy acid. The second layer contains an alumina hydrate and a sulfonic acid. The ink receiving layer of the present embodiment may include a first layer and a second layer, or may further include another ink receiving layer other than the first layer and the second layer, or a plurality of layers including three or more layers. For example, the ink receiving layer may include a first layer, a second layer, and a third ink receiving layer in order from the side adjacent to the substrate.

The thickness of the ink receiving layer is preferably 15 μm or more to 60 μm or less, more preferably 30 μm or more to 45 μm or less. The thickness ratio between the first layer and the second layer (thickness of second layer/thickness of first layer) is preferably 0.02 or more to 0.70 or less from the viewpoint of balancing the high image density and suppression of the bronzing phenomenon and image blurring under high humidity. The thickness ratio between the first layer and the second layer is more preferably 0.05 or more to 0.50 or less, still more preferably 0.10 or more to 0.30 or less. The thickness of the first layer is preferably 10 μm or more to 40 μm or less, more preferably 15 μm or more to 35 μm or less, still more preferably 20 μm or more to 30 μm or less. With a thickness of the first layer of 10 μm or more, the image blurring under high humidity can be sufficiently suppressed. With a thickness of the first layer of 40 μm or less, occurrence of cracks in a coated surface during drying can be sufficiently suppressed. The thickness of the second layer is preferably 1 μm or more to 10 μm or less, more preferably 2 μm or more to 8 μm or less, still more preferably 3 μm or more to 6 μm or less. With a thickness of the second layer of 1 μm or more, the effect of the hydroxy acid contained in the first layer on the second layer is sufficiently suppressed, so that reduction of the image density can be suppressed. In the case where the ink receiving layer includes a plurality of layers including three or more layers, the thickness of the ink receiving layers in total other than the first layer and the second layer is preferably 0.05 μm or more to 3.0 μm or less.

The ink receiving layer can be formed by applying a coating liquid for formation of the ink receiving layer on a substrate and drying the coating liquid. The coating liquid for formation of the first layer contains an alumina hydrate dispersion liquid in which an alumina hydrate is dispersed with a hydroxy acid as deflocculating acid. The coating liquid for formation of the second layer contains an alumina hydrate dispersion liquid in which an alumina hydrate is dispersed with a sulfonic acid as deflocculating acid. The coating liquid for formation of the first layer and the second layer may further contain a binder, a crosslinking agent, an inorganic particle other than the alumina hydrate, an additive, or the like. Incidentally, it is presumed that the hydroxy acid or the sulfonic acid as deflocculating acid is coordinated with adsorption to the surface of the alumina hydrate particle in a dispersion liquid (sol), and the adsorption state of the deflocculating acid is maintained even in a solid state after drying of the applied coating liquid for formation of the ink receiving layer. In other words, the hydroxy acid and the sulfonic acid are present in an unchanged state in the first layer and the second layer, respectively.

(Alumina Hydrate)

An alumina hydrate is not particularly limited, and a compound represented by the following formula (1) is preferred.

   Formula (1)

In the formula (1), n is 0, 1, 2 or 3, and m is 0 or more to 10 or less, preferably 0 or more to 5 or less. Since $mH_2O$ represents an aqueous phase which can be released without involving in the formation of a crystal lattice in many cases, m can be a value that is not an integer. Further, when the alumina hydrate is heated, m can be a value of 0. However, n and m are not 0 at the same time.

Among alumina hydrates, an alumina hydrate with a boehmite structure or in an amorphous form proved by X-ray diffraction is preferred. Specific examples thereof include an alumina hydrate described in Japanese Patent Application Laid-Open No. H7-232473, Japanese Patent Application Laid-Open No. H8-132731, Japanese Patent Application Laid-Open No. H9-66664, Japanese Patent Application Laid-Open No. H9-76628. Examples thereof available on the market include an alumina hydrate manufactured by Sasol Limited (trade name: DISPERAL HP14).

Preferably, the primary particle of the alumina hydrate has a number average particle diameter of 5 nm or more to 50 nm or less. As the alumina hydrate, a plate-like alumina hydrate having an aspect ratio of 2 or more is preferred. Incidentally, the aspect ratio can be obtained by a method described in Japanese Patent Publication No. H5-16015. In other words, the aspect ratio is represented by a ratio of "diameter" to "thickness" of a particle. The term "diameter" means the diameter of a circle having an area equal to the projected area of a particle of alumina hydrate observed by a microscope or an electron microscope (equivalent circle diameter).

The specific surface area of the alumina hydrate calculated by a BET method is preferably 100 $m^2/g$ or more to 200 $m^2/g$ or less, more preferably 125 $m^2/g$ or more to 175 $m^2/g$ or less. Incidentally, the BET method is one of the methods for measuring the surface area of a powder by gas phase adsorption, i.e., a method for determining the total surface area of a 1 g sample or the specific surface area from an adsorption isotherm. In the BET method, nitrogen is usually used as adsorption gas. In most cases, the amount of gas adsorbed is measured based on the change in the pressure or volume of the gas to be adsorbed. On this occasion, Brunauer, Emmett and Teller equation referred to as BET equation is most commonly used to represent an isotherm in multi-molecular adsorption for determination of a specific surface area. In the BET method, an amount adsorbed determined based on the BET equation is multiplied by an area of the surface occupied by one adsorption molecule so as to obtain the specific surface area. In measurement of nitrogen adsorption and release in the BET method, a relationship of the amount adsorbed to a relative pressure is measured at several points, and a slope of the plots and an intercept are determined by least squares method, so that the specific surface area can be derived. In the present invention, the relationship between relative pressure and amount adsorbed is measured at 5 points to derive the specific surface area.

The alumina hydrate can be produced by a known method such as hydrolysis of aluminum alkoxide and hydrolysis of sodium aluminate as described in U.S. Pat. Nos. 4,242,271 and 4,202,870. Alternatively, the alumina hydrate can be produced by a known method such as neutralization of an aqueous solution of sodium aluminate or the like by addition of an aqueous solution of aluminum sulfate, aluminum chloride or the like.

The content of an alumina hydrate in the first layer is preferably 30% by mass or more to 95% by mass or less, more preferably 40% by mass or more to 90% by mass or less, based on the total mass of the first layer. The content of an alumina hydrate in the second layer is preferably 40% by mass or more to 95% by mass or less, more preferably 50% by mass or more to 90% by mass or less, based on the total mass of the second layer. Further, it is preferred that the content of an alumina hydrate in the second layer is more than the content of an alumina hydrate in the first layer.

(Deflocculating Acid)

As the hydroxy acid contained in the first layer, glycolic acid, lactic acid, glyceric acid and hydroxybutyric acid are preferred, and glycolic acid and lactic acid are more preferred, from the viewpoint of further suppressing the bronzing phenomenon and the image blurring under high humidity. These hydroxy acids may be used singly or in combination of two or more thereof. It is preferred that the first layer contains no sulfonic acid.

As the sulfonic acid contained in the second layer, methanesulfonic acid, ethanesulfonic acid, 1-propanesulfonic acid, 2-propanesulfonic acid, chloromethanesulfonic acid, dichloromethanesulfonic acid, trichloromethanesulfonic acid, and trifluoromethanesulfonic acid are preferred from the viewpoints of having a further high image density and further suppressing the image blurring under high humidity. These sulfonic acids may be used singly or in combination of two or more thereof. It is preferred that the second layer contains no hydroxy acid.

The content of hydroxy acid in the first layer is preferably 200 mmol or more to 500 mmol or less, more preferably 200 mmol or more to 400 mmol or less, still more preferably 200 mmol or more to 300 mmol or less, relative to 1 kg of alumina hydrates in total in the first layer. With a content of hydroxy acid of 200 mmol or more, increase in sol viscosity of the coating liquid can be sufficiently suppressed. With a content of hydroxy acid of 500 mmol or less, the deflocculating effect does not further increase, so that degradation of image quality due to bronzing phenomenon and occurrence of beading can be sufficiently suppressed.

The content of sulfonic acid in the second layer is preferably 100 mmol or more to 300 mmol or less, more preferably 120 mmol or more to 250 mmol or less, still more preferably 150 mmol or more to 220 mmol or less, relative to 1 kg of alumina hydrates in total in the second layer. With a content of sulfonic acid of 100 mmol or more, increase in sol viscosity of the coating liquid can be sufficiently suppressed, and the image blurring under high humidity also can be sufficiently suppressed. With a content of sulfonic acid of 300 mmol or less, the deflocculating effect does not further increase, so that degradation of image quality due to bronzing phenomenon and occurrence of beading can be sufficiently suppressed.

(Alumina Hydrate Dispersion Liquid)

The alumina hydrate dispersion liquid for formation of the first layer includes an alumina hydrate dispersed in a dispersion medium with a hydroxy acid as deflocculating acid. The alumina hydrate dispersion liquid for formation of the second layer includes an alumina hydrate dispersed in a dispersion medium with a sulfonic acid as deflocculating acid. As the dispersion medium of the alumina hydrate dispersion liquids, water is preferred.

The alumina hydrate dispersion liquid for formation of the first layer and the second layer have a solid content of preferably 10% by mass or more to 40% by mass or less. With a solid content of 10% by mass or more in the alumina hydrate dispersion liquid, occurrence of cracks during coating can be sufficiently suppressed. With a solid content of 40% by mass or less in the alumina hydrate dispersion liquid, the dispersion liquid is stabilized not to cause gelation, so that degradation of coating properties can be sufficiently suppressed. From the viewpoint of viscosity stability of the dispersion liquid, a solid content of 20% by mass or more to 35% or less in the alumina hydrate dispersion liquid is more preferred. Incidentally, the solid content in the alumina hydrate dispersion liquid is a mass ratio of the total solid contained in the alumina hydrate dispersion liquid relative to the total mass of the alumina hydrate dispersion liquid.

An alumina hydrate particle in the alumina hydrate dispersion liquid can have a desired particle diameter through a physical unit such as a milling/deflocculating machine. Examples of the milling/deflocculating machine include various known deflocculating machines such as a high-pressure homogenizer, an ultrasonic homogenizer, a wet media mill (a sand mill and a ball mill), a continuous high-speed agitating/deflocculating machine, and an ultrasonic deflocculating machine.

The alumina hydrate dispersion liquid may contain a pigment dispersant, a thickener, a fluidity improver, a defoamer, a foam suppresser, a surfactant, a release agent, a permeation agent, a coloring pigment, a coloring dye, a fluorescent whitening agent, a UV absorber, an antioxidant, a preservative, a fungicide, a waterproofing agent, a dye fixing agent, a hardener, a weatherproofing material, and the like on an as needed basis.

(Binder)

The coating liquids for formation of the first layer and the second layer may contain a binder in addition to the alumina hydrate dispersion liquid in order to maintain the properties of the first layer and the second layer as a coating film. In other words, the first layer and the second layer may contain a binder. As the binder, a hydrophilic binder is preferred. Examples of the hydrophilic binder include polyvinyl alcohol and a derivative thereof, gelatin, polyvinylpyrrolidone, polyethylene oxide, polyacrylic acid, polyacryl amide, dextrin, hydroxyethyl cellulose, carboxymethyl cellulose, and starch. These may be used singly or in combination of two or more thereof. Among them, a hydrophilic binder having low swelling properties at about room temperature is preferred from the viewpoint of sufficient suppression of clogging of voids caused by swelling during an early stage of ink permeation. Specifically, a wholly or partially saponified polyvinyl alcohol and a cation-modified polyvinyl alcohol are preferred.

Among polyvinyl alcohols, a polyvinyl alcohol having a saponification degree of 80 mol % or more to 100 mol % (completely saponified) or less is preferred from the viewpoint of waterproofness, ink absorbing properties and color development properties. From the viewpoint of preventing occurrence of cracks in a coated surface during drying, a polyvinyl alcohol having a weight average polymerization degree of 500 or more to 5000 or less is preferred. Incidentally, the saponification degree is a value measured by a method in accordance with JIS K6726. Chemically speaking, the saponification degree is a proportion of number of moles of the hydroxy group produced in a saponification reaction when polyvinyl acetate is saponified to make polyvinyl alcohol. Examples of the cation-modified polyvinyl alcohol include a polyvinyl alcohol having a primary to tertiary amino group or a quaternary ammonium group in a main chain or a side chain of the polyvinyl alcohol as described in Japanese Patent Application Laid-Open No. S61-10483.

The content of a binder in the coating liquids for formation of the first layer and the second layer is preferably 7 parts by mass or more to 20 parts by mass or less relative to 100 parts by mass of alumina hydrate-containing inorganic particle as solid content from the viewpoints of sufficient suppression of occurrence of cracks in the coated surface during drying and achievement of excellent ink absorbing properties. Preferably, the content of a binder in the first layer and the second layer is also in the same range as described above. In the case of using a hydrophilic binder as the binder, a non-water-soluble binder such as polymer latex may be also used in combination.

(Crosslinking Agent)

Preferably, the coating liquid for formation of the first layer and the second layer contain a crosslinking agent in addition to a binder. In other words, the first layer and the second layer may contain a crosslinking agent. Examples of the crosslinking agent include an aldehyde compound, a melamine compound, an isocyanate compound, a zirconium compound, an amide compound, an aluminum compound, boric acid, and a borate. These may be used singly or in combination of two or more thereof. Among them, a boric acid and a borate are preferred from the viewpoints of the rate of crosslinking and the prevention of occurrence of cracks in the coated surface.

Examples of the boric acid include orthoboric acid ($H_3BO_3$), metaboric acid, and diboric acid. Examples of the borate include an orthoborate (for example, $InBO_3$, $ScBO_3$, $YBO_3$, $LaBO_3$, $Mg_3(BO_3)_2$ and $Co_3(BO_3)_2$), a diborate (for example, $Mg_2B_2O_5$ and $Co_2B_2O_5$), a metaborate (for example, $LiBO_2$, $Ca(BO_2)_2$, $NaBO_2$ and $KBO_2$), a tetraborate (for example, $Na_2B_4O_7.10H_2O$) and a pentaborate (for example, $KB_5O_8.4H_2O$ and $CsB_5O_5$). Among these boric acids and borates, orthoboric acid is preferred from the viewpoint of the stability of the coating liquid over time and the effect of suppressing occurrence of cracks.

The content of a crosslinking agent in the coating liquids for formation of the first layer and the second layer is preferably 0.2 parts by mass or more to 8.0 parts by mass or less relative to 100 parts by mass of alumina hydrate-containing inorganic particle as solid content from the viewpoints of the viscosity stability of the coating liquid and the ink absorbing properties. The content of a crosslinking agent in a coating liquid is more preferably 0.5 parts by mass or more to 4.0 parts by mass or less. Preferably, the content of a crosslinking agent in the first layer and the second layer is also in the same range described above.

In the case of using orthoboric acid as the crosslinking agent, use of orthoboric acid in an aqueous solution is preferred. The content of orthoboric acid in the coating liquids for formation of the first layer and the second layer is preferably 0.5 parts by mass or more to 8.0 parts by mass or less relative to 100 parts by mass of alumina hydrate-containing inorganic particle as solid content from the viewpoints of suppressing the reduction in the drying rate caused by reduction in the concentration of the coating liquid and the precipitation of orthoboric acid. Preferably, the content of orthoboric acid in the first layer and the second layer is also in the same range as described above. Incidentally, the sequence of addition of the binder and the crosslinking agent in preparation of the coating liquids is not particularly limited.

(Inorganic Particle Other than Alumina Hydrate)

The coating liquids for formation of the first layer and the second layer can contain an inorganic particle other than alumina hydrate on an as needed basis. In other words, the first layer and the second layer can contain an inorganic particle other than alumina hydrate. Examples of the other inorganic particle include gas phase-synthesized silica, alumina, colloidal silica, titanium dioxide, zeolite, kaolin, talc, hydrotalcite, zinc oxide, zinc hydroxide, aluminum silicate, calcium silicate, magnesium silicate, zirconium oxide and zirconium hydroxide. These may be used singly or in combination of two or more thereof. Among them, gas phase-synthesized silica is preferred from the viewpoint of achieving high ink absorbing properties. In particular, a first layer containing gas phase-synthesized silica is preferred, because the ink absorbing properties can be improved without impairment of the image clarity of the surface of the ink receiving layer. From the viewpoints of the ink absorbing properties and the image density, the specific surface area of the gas phase-synthesized silica is preferably 100 $m^2/g$ or more to 400 $m^2/g$ or less, more preferably 200 $m^2/g$ or more to 350 $m^2/g$ or less.

In the case of using both of alumina hydrate and gas phase-synthesized silica as an inorganic particle, the mass ratio between the alumina hydrate and the gas phase-synthesized silica (alumina hydrate:gas phase-synthesized silica) is preferably 70:30 to 30:70, more preferably 60:40 to 40:60. With a mass ratio between the alumina hydrate and the gas phase-synthesized silica in the range, the occurrence of cracks in the ink receiving layer can be effectively suppressed.

(Additive)

The coating liquids for formation of the first layer and the second layer may contain various additives on an as needed basis. In other words, the first layer and the second layer can contain various additives. Examples of the additives include a fixing agent such as a cationic resin, an aggregation agent such as a multivalent metal salt, a surfactant, a fluorescent whitening agent, a thickener, a defoamer, a foam suppresser, a release agent, a permeation agent, a lubricant, a UV absorber, an antioxidant, a levelling agent, a preservative, a pH adjuster, a pigment dispersant, a fluidity improver, a coloring pigment, a coloring dye, a fungicide, a waterproofing agent, a hardener, and a weatherproofing material, and other various auxiliaries known in the technical field of the present invention. The amount of the additives added can be appropriately adjusted.

Examples of the cationic resin include a polyethylene imine resin, a polyamine resin, a polyamide resin, a polyamide epichlorohydrin resin, a polyamine epichlorohydrin resin, polyamide polyamine epichlorohydrin resin, a polydiallylamine resin, and a dicyandiamide condensate. These may be used singly or in combination of two or more thereof.

(Method for Forming Ink Receiving Layer)

The ink receiving layer including the first layer and the second layer can be formed by a known coating method such as a slot-die method, a slide bead method, a curtain method, an extrusion method, an air knife method, a roll coating method, and a rod bar coating method. The first layer and the second layer may be sequentially formed by coating and drying, or may be formed by simultaneous multilayer coating. In particular, simultaneous multilayer coating using a slide bead is preferred due to having high productivity. For use in drying after coating, for example, a hot air dryer such as a linear tunnel dryer, an arch dryer, an air loop dryer and a sine-curve air float dryer, an IR, a heating dryer and a microwave dryer may be appropriately selected.

The present invention can provide a recording medium substrate allowing a recording medium having high image clarity while maintaining the texture of paper to be provided. Further, the present invention can provide a recording medium having a high image density, with a bronzing phenomenon and image blurring under high humidity being suppressed.

EXAMPLES

The present invention is described in further detail with reference to Examples and Comparative Examples as follows. The present invention is not limited to the following Examples as long as within the scope of the invention. Incidentally, in the description of the following Examples, the term "part" is based on mass unless otherwise noted.

Substrates and recording media that were used in Examples and Comparative Examples are described as follows. First, a method for preparing a coating liquid for formation of an ink receiving layer used for formation of an ink receiving layer is described.

(Preparation of Coating Liquid for Formation of Ink Receiving Layer)

Preparation of Alumina Hydrate Dispersion Liquid 1

To 498 parts of deionized water, 2 parts of lactic acid was added. While stirring the aqueous solution of lactic acid thus obtained with a homo mixer (trade name: T.K.HOMO MIXER MARK II 2.5, manufactured by Tokushu Kika Kogyo Co., Ltd.) under conditions at 3000 rpm, 100 parts of alumina hydrate (trade name: DISPERAL HP14, manufactured by Sasol Limited) was added thereto little by little. After the addition of alumina hydrate, stirring was continued for 30 minutes without change, so that an alumina hydrate dispersion liquid 1 deflocculated by lactic acid was obtained. The alumina hydrate dispersion liquid 1 had a solid content of 23% by mass.

Preparation of Alumina Hydrate Dispersion Liquid 2

An alumina hydrate dispersion liquid 2 deflocculated by glycolic acid was obtained by the same manner as in the preparation of the alumina hydrate dispersion liquid 1, except that glycolic acid was used as the deflocculating acid instead of lactic acid. The alumina hydrate dispersion liquid 2 had a solid content of 23% by mass.

Preparation of Alumina Hydrate Dispersion Liquid 3

An alumina hydrate dispersion liquid 3 deflocculated by glyceric acid was obtained by the same manner as in the preparation of the alumina hydrate dispersion liquid 1, except that glyceric acid was used as the deflocculating acid instead of lactic acid. The alumina hydrate dispersion liquid 3 had a solid content of 23% by mass.

Preparation of Alumina Hydrate Dispersion Liquid 4

An alumina hydrate dispersion liquid 4 deflocculated by methanesulfonic acid was obtained by the same manner as in the preparation of the alumina hydrate dispersion liquid 1, except that methanesulfonic acid was used as the deflocculating acid instead of lactic acid. The alumina hydrate dispersion liquid 4 had a solid content of 23% by mass.

Preparation of Alumina Hydrate Dispersion Liquid 5

An alumina hydrate dispersion liquid 5 deflocculated by ethanesulfonic acid was obtained by the same manner as in the preparation of the alumina hydrate dispersion liquid 1, except that ethanesulfonic acid was used as the deflocculating acid instead of lactic acid. The alumina hydrate dispersion liquid 5 had a solid content of 23% by mass.

Preparation of Alumina Hydrate Dispersion Liquid 6

An alumina hydrate dispersion liquid 6 deflocculated by 1-propanesulfonic acid was obtained by the same manner as in the preparation of the alumina hydrate dispersion liquid 1, except that 1-propanesulfonic acid was used as the deflocculating acid instead of lactic acid. The alumina hydrate dispersion liquid 6 had a solid content of 23% by mass.

Preparation of Alumina Hydrate Dispersion Liquid 7

An alumina hydrate dispersion liquid 7 deflocculated by trifluoromethanesulfonic acid was obtained by the same manner as in the preparation of the alumina hydrate dispersion liquid 1, except that trifluoromethanesulfonic acid was used as the deflocculating acid instead of lactic acid. The alumina hydrate dispersion liquid 7 had a solid content of 23% by mass.

Preparation of Alumina Hydrate Dispersion Liquid 8

An alumina hydrate dispersion liquid 8 deflocculated by acetic acid was obtained by the same manner as in the preparation of the alumina hydrate dispersion liquid 1, except that acetic acid was used as the deflocculating acid instead of lactic acid. The alumina hydrate dispersion liquid 8 had a solid content of 23% by mass.

Preparation of Gas Phase-Synthesized Silica Dispersion Liquid 1

To 333 parts of deionized water, 4.0 parts of a cationic polymer (trade name: SHALLOL DC902P, manufactured by DKS Co. Ltd.) was added. While stirring the aqueous solution of cationic polymer thus obtained with a homo mixer under conditions at 3000 rpm, 100 parts of gas phase-synthesized silica (trade name: AEROSIL 300, manufactured by EVONIK Industries AG) was added little by little thereto. After the addition of gas phase-synthesized silica, the mixture was diluted with deionized water and treated with a high-pressure homogenizer (trade name: NANOMIZER manufactured by Yoshida Kikai Co., Ltd.) twice, so that a gas phase-synthesized silica dispersion liquid 1 was obtained. The gas phase-synthesized silica dispersion liquid 1 had a solid content of 20% by mass.

Preparation of Coating Liquid for Formation of First Layer (Coating Liquids A1 to A5)

An alumina hydrate dispersion liquid, a gas phase-synthesized silica dispersion liquid, an aqueous solution of polyvinyl alcohol (solid content: 8% by mass, trade name: PVA235 (manufactured by KURARAY Co., Ltd.)) and an aqueous solution of orthoboric acid (solid content: 4% by mass) were mixed to have a solid content shown in Table 1, so that each of coating liquids A1 to A5 was obtained.

TABLE 1

| Coating liquid for formation of first layer | Alumina hydrate dispersion liquid | | | Gas phase-synthesized silica dispersion liquid | | Polyvinyl alcohol aqueous solution | Orthoboric acid aqueous solution |
|---|---|---|---|---|---|---|---|
| | No. | Alumina hydrate content (part by mass) | Deflocculating acid | No. | Gas phase-synthesized silica content (part by mass) | Polyvinyl alcohol content (part by mass) | Orthoboric acid content (part by mass) |
| A1 | 1 | 50 | Lactic acid | 1 | 50 | 18 | 2.5 |
| A2 | 2 | 50 | Glycolic acid | 1 | 50 | 18 | 2.5 |
| A3 | 3 | 50 | Glyceric acid | 1 | 50 | 18 | 2.5 |
| A4 | 4 | 50 | Methanesulfonic acid | 1 | 50 | 18 | 2.5 |
| A5 | 8 | 50 | Acetic acid | 1 | 50 | 18 | 2.5 |

Preparation of Coating Liquid for Formation of Second Layer (Coating Liquids B1 to B6)

An alumina hydrate dispersion liquid, an aqueous solution of polyvinyl alcohol and an aqueous solution of orthoboric acid were mixed to have a solid content shown in Table 2, so that each of coating liquids B1 to B6 was obtained.

TABLE 2

| Coating liquid for formation of second layer | Alumina hydrate dispersion liquid | | | Polyvinyl alcohol aqueous solution | Orthoboric acid aqueous solution |
|---|---|---|---|---|---|
| | No. | Alumina hydrate content (part by mass) | Deflocculating acid | Polyvinyl alcohol content (part by mass) | Orthoboric acid content (part by mass) |
| B1 | 4 | 100 | Methanesulfonic acid | 10 | 1.0 |
| B2 | 5 | 100 | Ethanesulfonic acid | 10 | 1.0 |
| B3 | 6 | 100 | 1-Propanesulfonic acid | 10 | 1.0 |
| B4 | 7 | 100 | Trifluoromethanesulfonic acid | 10 | 1.0 |

TABLE 2-continued

| | Alumina hydrate dispersion liquid | | | Polyvinyl alcohol aqueous solution | Orthoboric acid aqueous solution |
|---|---|---|---|---|---|
| Coating liquid for formation of second layer | No. | Alumina hydrate content (part by mass) | Deflocculating acid | Polyvinyl alcohol content (part by mass) | Orthoboric acid content (part by mass) |
| B5 | 1 | 100 | Lactic acid | 10 | 1.0 |
| B6 | 8 | 100 | Acetic acid | 10 | 1.0 |

Preparation of Coating Liquid for Formation of Ink Receiving Layer with Mono Layer Structure (Coating Liquid C1)

The coating liquid A1 and the coating liquid B1 were mixed at a mass ratio of 50:50 to obtain a coating liquid C1.

Example 1

A coated paper having a thickness of 100 μm (trade name: OK KINFUJI PLUS 127.9 g/m², manufactured by Oji Paper Co., Ltd.) was prepared as base paper. The average surface roughness (Ra) of this base paper was measured by the method described later. On the rear face of the base paper, a resin composition including 40 parts of a low density polyethylene (LDPE) and 60 parts of a high density polyethylene (HDPE) was applied to have an application quantity in dry state of 40 g/m², so that a rear-face resin layer was formed. Incidentally, the face on which the rear-face resin layer was formed is defined as the rear face of a substrate. Further, on the surface of the base paper, a low density polyethylene (LDPE) was extrusion laminated to have an application quantity in dry state of 20 g/m². Next, a biaxially stretched polyester film having a thickness of 100 μm (trade name: MELINEX 329, manufactured by DuPont Teijin Film) was laminated on the adhesion layer of extrusion laminated low density polyethylene (LDPE), so that a substrate 1 was obtained. The average surface roughness Ra of the substrate 1 was measured by the following method, and the image clarity was evaluated. Results are shown in Table 3.

(Measurement of Average Surface Roughness Ra of Base Paper and Substrate)

The average surface roughness Ra of a base paper and a substrate was measured at a cut off value of 2.5 mm and an evaluation length of 12.5 mm in accordance with JIS B0601:2001 by using a surface roughness tester (trade name: SURFCORDER SE3500, manufactured by Kosaka Laboratory Ltd.), respectively.

(Evaluation on Image Clarity)

The coating liquid A1 and the coating liquid B1 were applied on the substrate 1 at the same time by a simultaneous multilayer coating method using a multilayer slide hopper coating apparatus. Through subsequent drying with hot air at 120° C., a recording medium having a first layer derived from the coating liquid A1 and a second layer derived from the coating liquid B1 formed on the substrate 1 in this order was made. The first layer had a thickness of 26 μm, and the second layer had a thickness of 4 μm. The surface of the recording medium on a side having the ink receiving layer was evaluated on the image clarity based on an image clarity testing method specified in JIS H 8686-2 using an image clarity meter (trade name: ICM-1, manufactured by Suga Test Instruments Co., Ltd.). The measurement was performed by a reflection method, at a measurement angle (incidence angle and light receiving angle) of 60°, using an optical comb of 2.0 mm.

Examples 2 to 10 and Comparative Examples 1 to 6

Substrates 2 to 16 were made and evaluated in the same manner as in Example 1, except that a base paper and a film layer shown in Table 3 were used as the base paper and the film layer, respectively. The results are shown in Table 3. Incidentally, the following were used as the base papers. MIRRORCOAT PLATINUM is manufactured by Oji Paper Co., Ltd., OPUS GLOSS COVER is manufactured by Sappi Limited, INVERCOAT G is manufactured by Iggesund Paperboard, OK PRINCE high-quality is manufactured by Oji Paper Co., Ltd., and MARSHMALLOW CoC is manufactured by Oji F-TEX Co., Ltd. Also, the following were used as the film papers. LUMIRROR S10 is manufactured by Toray Industries, Inc., TOYOBO ESTER E5101 is manufactured by TOYOBO CO., LTD., and LUMIRROR 10.51 is manufactured by Toray Industries, Inc. Also, in Comparative Example 5, a non-stretch polyester film having a thickness of 200 μm (trade name: NOVACLEAR, manufactured by Mitsubishi Chemical Corporation) was used as the film layer instead of a stretched film. In Comparative Example 6, a non-stretch polypropylene film having a thickness of 70 μm (trade name: RT-680 CA, manufactured by Idemitsu Unitech Co., Ltd.) was used as the film layer instead of a stretched film.

TABLE 3

| | | Base paper | | | | | Film layer | | | | Substrate | Image |
|---|---|---|---|---|---|---|---|---|---|---|---|---|
| | Substrate No. | Trade name | Coated layer | Thickness (μm) | Ra (μm) | Adhesion layer Material | Trade name | Stretching | Thickness (μm) | Material | Ra (μm) | clarity (%) |
| Example 1 | 1 | OK KINFUJI PLUS 127.9 g/m² | Present | 100 | 0.35 | LDPE | Melinex329 | Biaxially stretched | 100 | PET | 0.15 | 93 |
| Example 2 | 2 | OK KINFUJI PLUS 127.9 g/m² | Present | 100 | 0.35 | LDPE | Melinex329 | Biaxially stretched | 75 | PET | 0.20 | 90 |

TABLE 3-continued

| | Substrate No. | Base paper Trade name | Coated layer | Thickness (µm) | Ra (µm) | Adhesion layer Material | Film layer Trade name | Stretching | Thickness (µm) | Material | Substrate Ra (µm) | Image clarity (%) |
|---|---|---|---|---|---|---|---|---|---|---|---|---|
| Example 3 | 3 | OK KINFUJI PLUS 127.9 g/m² | Present | 100 | 0.35 | LDPE | Melinex329 | Biaxially stretched | 125 | PET | 0.12 | 94 |
| Example 4 | 4 | OK KINFUJI PLUS 127.9 g/m² | Present | 100 | 0.35 | LDPE | LUMIRROR S10 | Biaxially stretched | 100 | PET | 0.18 | 89 |
| Example 5 | 5 | OK KINFUJI PLUS 127.9 g/m² | Present | 100 | 0.35 | LDPE | TOYOBO ESTER E5101 | Biaxially stretched | 100 | PET | 0.14 | 90 |
| Example 6 | 6 | MIRRORCOAT PLATINUM 127.9 g/m² | Present | 100 | 0.38 | LDPE | Melinex329 | Biaxially stretched | 100 | PET | 0.15 | 88 |
| Example 7 | 7 | OPUS GLOSS COVER 216 g/m² | Present | 202 | 0.48 | LDPE | Melinex329 | Biaxially stretched | 100 | PET | 0.17 | 85 |
| Example 8 | 8 | INVERCOAT G 180 g/m² | Present | 150 | 0.67 | LDPE | Melinex329 | Biaxially stretched | 100 | PET | 0.21 | 82 |
| Example 9 | 9 | OK PRINCE high-quality 127.9 g/m² | Absent | 152 | 2.44 | LDPE | Melinex329 | Biaxially stretched | 100 | PET | 0.27 | 80 |
| Example 10 | 16 | MARSHMALLOW CoC | Absent | 151 | 1.80 | LDPE | Melinex329 | Biaxially stretched | 100 | PER | 0.15 | 90 |
| Comparative Example 1 | 10 | OK KINFUJI PLUS 127.9g/m² | Present | 100 | 0.35 | LDPE | Melinex329 | Biaxially stretched | 50 | PET | 0.32 | 72 |
| Comparative Example 2 | 11 | OK KINFUJI PLUS 127.9 g/m² | Present | 100 | 0.35 | LDPE | Lumirror10.51 | Biaxially stretched | 23 | PET | 0.43 | 67 |
| Comparative Example 3 | 12 | OK KINFUJI PLUS 127.9 g/m² | Present | 100 | 0.35 | LDPE | Melinex329 | Biaxially stretched | 60 | PET | 0.31 | 69 |
| Comparative Example 4 | 13 | OK PRINCE high-quality 127.9 g/m² | Absent | 152 | 2.44 | LDPE | Lumirror10.51 | Biaxially stretched | 50 | PET | 0.35 | 62 |
| Comparative Example 5 | 14 | OK KINFUJI PLUS 127.9 g/m² | Present | 100 | 0.35 | LDPE | NOVACLEAR | Absent | 200 | PET | 0.32 | 64 |
| Comparative Example 6 | 15 | OK KINFUJI PLUS 127.9 g/m² | Present | 100 | 0.35 | LDPE | RT-680CA | Absent | 70 | PP | 0.34 | 67 |

Example 11

The coating liquid A1 and the coating liquid B1 were applied on a substrate 1 at the same time by a simultaneous multilayer coating method using a multilayer slide hopper coating apparatus. Through subsequent drying with hot air at 120° C., a recording medium 1 having a first layer derived from the coating liquid A1 and a second layer derived from the coating liquid B1 formed on the substrate 1 in this order was made. The first layer had a thickness of 26 µm, and the second layer had a thickness of 4 µm. The recording medium 1 was evaluated on the image density, the bronzing phenomenon and the image blurring under high humidity by the following methods. The results are shown in Table 4.

(Evaluation on Image Density)

A solid black image print was provided on the surface of a recording medium on the side having the ink receiving layer using an inkjet recording apparatus (trade name: TS 9030, manufactured by Canon Inc.) in a mode with a Pro Platinum-grade gloss and no color correction. The optical density of the recording medium surface with the printed image was measured by using an optical reflection densitometer (trade name: SPECTRODENSITOMETER 530, manufactured by X-lite Inc.) for evaluation based on the following criteria. Incidentally, with a rating of 3 or more in the following criteria, the recording medium has no problem in practical use.

5: The optical density was 2.40 or more.
4: The optical density was 2.35 or more to less than 2.40.
3: The optical density was 2.30 or more to less than 2.35.
2: The optical density was 2.25 or more to less than 2.30.
1: The optical density was less than 2.25.

(Evaluation on Bronzing Phenomenon)

A solid cyan image print (image data in which gradation values of the respective ink colors were (C, M, Y, K)=(52, 13, 0, 0)) was provided on the surface of a recording medium on the side having the ink receiving layer using an inkjet recording apparatus (trade name: TS 9030, manufactured by Canon Inc.) in a mode with a Pro Platinum-grade gloss and no color correction. The occurrence of bronzing phenomenon was then evaluated based on the following criteria through visual observation. Incidentally, with a rating of 3 or more in the following criteria, the recording medium has no problem in practical use.

5: No occurrence of bronzing phenomenon was observed.
4: A slight reddish tinge was observed in the reflection light.
3: A reddish tinge was observed in the reflection light.
2: A bronzing phenomenon exhibiting metallic luster occurred.
1: A bronzing phenomenon exhibiting metallic luster occurred and the gloss in the solid printed part lowered.

(Evaluation on Image Blurring Under High Humidity)

Twenty 2 by 2 grid-shaped characters in 20-point size were outlined in a solid blue image print (image data in which gradation values of the respective ink colors were (C, M, Y, K)=(88, 77, 0, 0)) on the surface of a recording medium on the side having the ink receiving layer using an inkjet recording apparatus (trade name: TS 9030, manufactured by Canon Inc.) in a mode with a Pro Platinum-grade gloss and no color correction. The recording medium was stored under an environment at 30° C. and 90% R. H. for 1 week, and then among cyan and magenta constituting of the solid blue image, focused on magenta easy to blur, the ratio of magenta blurring in the outlined part was visually evaluated based on the following criteria. Incidentally, with a rating of 3 or more in the following criteria, the recording medium has no problem in practical use.

5: No bleeding of magenta to the white background was observed at all.
4: Although bleeding of magenta to the white background was observed, narrowing of the line width of the 2 by 2 grid-shaped characters was hardly confirmed by visual observation.
3: Bleeding of magenta to the white background was observed, and it was visually confirmed that the line width of the 2 by 2 grid-shaped characters was a half or more of the width before storage.
2: Bleeding of magenta to the white background was observed, and it was visually confirmed that the line width of the 2 by 2 grid-shaped characters was a half or less of the width before storage. The printed characters, however, were visually recognized.
1: Bleeding of magenta to the entire white background occurred, and the printed characters were not recognized at all.

Examples 12 to 22 and Comparative Examples 7 to 12

Recording media 2 to 18 were made and evaluated in the same manner as in Example 11, except that the coating liquids shown in Table 4 were used as the coating liquids for formation of the first layer and the second layer, and the thickness of the first layer and the second layer was changed as shown in Table 4. The results are shown in Table 4. Incidentally, in Comparative Example 9, the substrate 1 was coated with a coating liquid C1 using a slot for first layer alone of a multilayer slide hopper coating apparatus. Subsequently, through drying with hot air at 120° C., a recording medium 14 having a mono-layered ink receiving layer having a thickness of 30 μm was made on the substrate 1.

TABLE 4

| | Recording medium No. | Substrate No. | First layer Coating liquid | First layer Defloccu- lating acid | First layer Thickness (μm) | Second layer Coating liquid | Second layer Defloccu- lating acid | Second layer Thickness (μm) | Thickness ratio (second layer/first layer) | Image density | Bronzing phenomenon | Image blurring under high humidity |
|---|---|---|---|---|---|---|---|---|---|---|---|---|
| Example 11 | 1 | 1 | A1 | Lactic acid | 26 | B1 | Methanesulfonic acid | 4 | 0.154 | 5 | 5 | 5 |
| Example 12 | 2 | 1 | A1 | Lactic acid | 26 | B2 | Ethanesulfonic acid | 4 | 0.154 | 5 | 5 | 5 |
| Example 13 | 3 | 1 | A2 | Glycolic acid | 26 | B3 | 1-Propanesulfonic acid | 4 | 0.154 | 5 | 5 | 5 |
| Example 14 | 4 | 1 | A3 | Glyceric acid | 26 | B1 | Methanesulfonic acid | 4 | 0.154 | 4 | 5 | 3 |
| Example 15 | 5 | 1 | A1 | Lactic acid | 29 | B1 | Methanesulfonic acid | 1 | 0.034 | 4 | 5 | 3 |
| Example 16 | 6 | 1 | A1 | Lactic acid | 29.5 | B1 | Methanesulfonic acid | 0.5 | 0.017 | 3 | 5 | 3 |
| Example 17 | 7 | 1 | A1 | Lactic acid | 20 | B1 | Methanesulfonic acid | 10 | 0.500 | 5 | 4 | 5 |
| Example 18 | 8 | 1 | A1 | Lactic acid | 17 | B1 | Methanesulfonic acid | 13 | 0.765 | 5 | 3 | 3 |
| Example 19 | 9 | 1 | A1 | Lactic acid | 26 | B4 | Trifluoromethanesulfonic acid | 4 | 0.154 | 3 | 3 | 5 |
| Example 20 | 10 | 1 | A1 | Lactic acid | 20 | B1 | Methanesulfonic acid | 4 | 0.200 | 5 | 5 | 4 |
| Example 21 | 11 | 1 | A1 | Lactic acid | 16 | B1 | Methanesulfonic acid | 4 | 0.250 | 4 | 5 | 3 |
| Example 22 | 18 | 16 | A1 | Lactic acid | 26 | B1 | Methanesulfonic acid | 4 | 0.154 | 5 | 5 | 5 |
| Comparative Example 7 | 12 | 1 | A4 | Methanesulfonic acid | 26 | B1 | Methanesulfonic acid | 4 | 0.154 | 2 | 1 | 3 |
| Comparative Example 8 | 13 | 1 | A1 | Lactic acid | 26 | B5 | Lactic acid | 4 | 0.154 | 1 | 5 | 2 |
| Comparative Example 9 | 14 | 1 | C1 | Lactic acid, Methanesulfonic acid | 30 | — | — | — | — | 2 | 5 | 5 |
| Comparative Example 10 | 15 | 1 | A4 | Methanesulfonic acid | 26 | B5 | Lactic acid | 4 | 0.154 | 2 | 3 | 5 |
| Comparative Example 11 | 16 | 1 | A5 | Acetic acid | 26 | B1 | Methanesulfonic acid | 4 | 0.154 | 5 | 2 | 2 |

TABLE 4-continued

| | | | First layer | | | | Second layer | | Thickness ratio | | | Image |
|---|---|---|---|---|---|---|---|---|---|---|---|---|
| | Recording medium No. | Substrate No. | Coating liquid | Deflocculating acid | Thickness (μm) | Coating liquid | Deflocculating acid | Thickness (μm) | (second layer/first layer) | Image density | Bronzing phenomenon | blurring under high humidity |
| Comparative Example 12 | 17 | 1 | A1 | Lactic acid | 26 | B6 | Acetic acid | 4 | 0.154 | 5 | 3 | 1 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-217187, filed Nov. 10, 2017, which is hereby incorporated by reference herein in its entirety.

What is claimed is:

1. A recording medium comprising a recording medium substrate, a first ink receiving layer on the recording medium substrate, and a second ink receiving layer on the first ink receiving layer,
    wherein the first ink receiving layer is in contact with the second ink receiving layer;
    wherein the first ink receiving layer comprises an alumina hydrate and a hydroxy acid and does not comprise a sulfonic acid; and
    wherein the second ink receiving layer comprises an alumina hydrate and a sulfonic acid.

2. The recording medium according to claim 1, wherein the hydroxy acid is at least one selected from the group consisting of glycolic acid, lactic acid, glyceric acid, and hydroxybutylic acid.

3. The recording medium according to claim 1, wherein the sulfonic acid is at least one selected from the group consisting of methanesulfonic acid, ethanesulfonic acid, 1-propanesulfonic acid, 2-propanesulfonic acid, chloromethanesulfonic acid, dichloromethanesulfonic acid, trichloromethanesulfonic acid, and trifluoromethanesulfonic acid.

4. The recording medium according to claim 1, wherein a thickness ratio between the first ink receiving layer and the second ink receiving layer (thickness of second ink receiving layer/thickness of first ink receiving layer) is 0.02 or more to 0.70 or less.

5. The recording medium according to claim 1, wherein the content of the hydroxyl acid in the first ink receiving layer is 200 mmol or more to 500 mmol or less relative to 1 kg of the alumina hydrates in total in the first ink receiving layer.

6. The recording medium according to claim 1, wherein the content of the sulfonic acid in the second ink receiving layer is 100 mmol or more to 300 mmol or less relative to 1 kg of the alumina hydrates in total in the second ink receiving layer.

7. The recording medium according to claim 1, wherein the second ink receiving layer does not comprise a hydroxy acid.

8. The recording medium according to claim 1, wherein the recording medium substrate has a base paper and a stretched film layer on the base paper,
    wherein the stretched film layer has a thickness of 70 μm or more, and
    wherein the recording medium substrate has an average surface roughness of 0.3 μm or less.

9. The recording medium according to claim 8, wherein the recording medium substrate has an adhesion layer between the base paper and the stretched film layer.

10. The recording medium according to claim 8, wherein the base paper has an average surface roughness of 0.5 μm or less.

11. The recording medium according to claim 8, wherein the stretched film layer comprises a biaxially stretched polyester film.

* * * * *